United States Patent Office 3,487,643
Patented Jan. 6, 1970

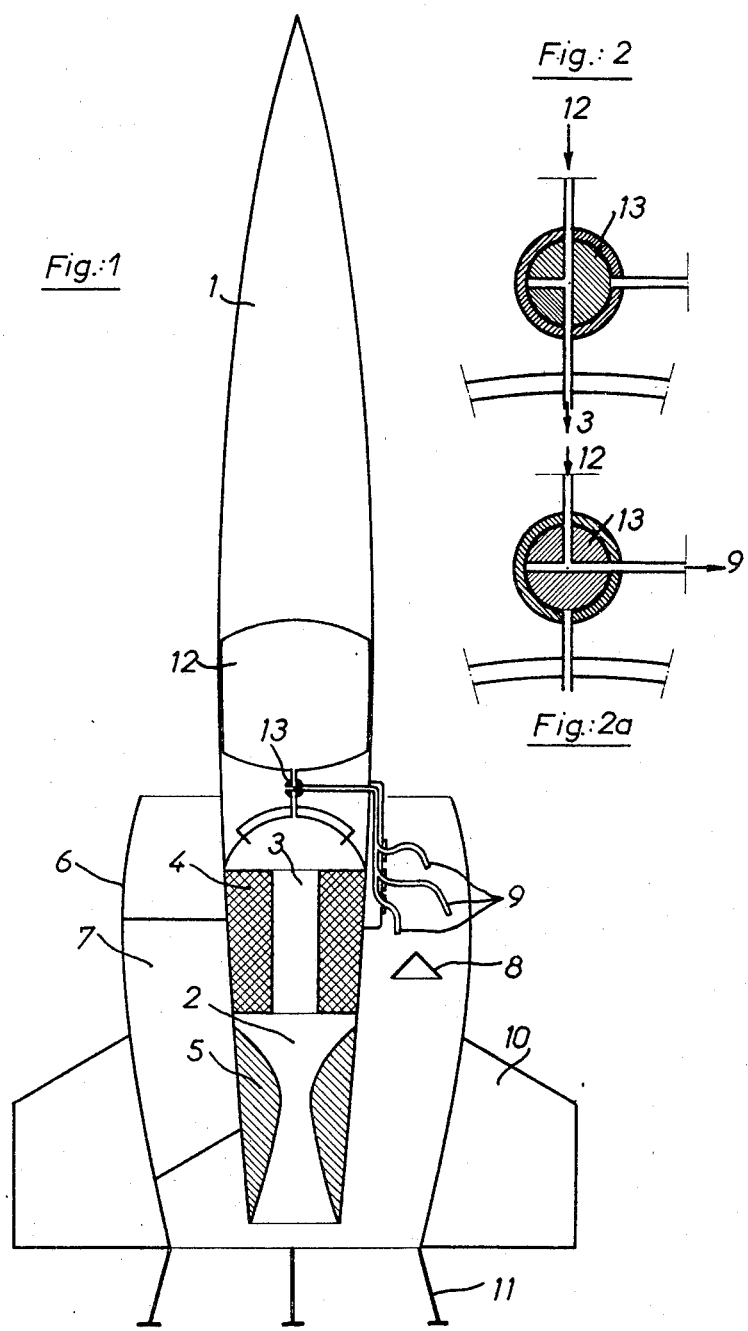

3,487,643
COMPOSITE RAMJET/ROCKET PROPULSION UNIT
Don Pierre Louis Jean Colombani, Versailles, France, assignor to Societe Nationale d'Etude et de Construction de Moteurs d'Aviation, Paris, France, a company of France
Filed Apr. 14, 1967, Ser. No. 630,984
Claims priority, application France, Apr. 15, 1966, 57,818
Int. Cl. F02k 9/06, 7/00
U.S. Cl. 60—225                                                      2 Claims

ABSTRACT OF THE DISCLOSURE

A composite ramjet/rocket propulsion unit utilizing a solid oxidizer grain for operation of the rocket and a liquid-fuel feed system for operation of the ramjet and the rocket.

BACKGROUND OF THE INVENTION

It has already been proposed to use a combined ramjet/rocket type of propulsion unit for aircraft and missiles, since the ramjet and the rocket have complementary operational envelopes and can be particularly advantageous when used jointly on the same aircraft.

Since the ramjet develops no static thrust, the rocket is used for take off until a speed is reached at which the ramjet can be started up and can operate with worthwhile efficiency. When the aircraft or missile reaches an altitude at which there is insufficient air for the ramjet to operate, the rocket takes over the propulsion function. Thus, unlike the pure rocket, such a composite system does not require to carry the oxidizer consumed during the aerial phase, since this is supplied by the surrounding air.

Simultaneous operation of the rocket and the ramjet may also be envisaged. This enables the total thrust developed by the aircraft or the missile to be greatly increased over a major part of the flight path, and indeed the overall efficiency of the system can be greater than the efficiency of either propulsion mode used separately.

Certain prior art composite propulsion systems employ a common fuel for the ramjet and the rocket. Since this fuel is of the liquid type, the oxidizer used for the rocket is likewise of the liquid type.

SUMMARY OF THE INVENTION

It is the object of the present invention to provide a composite ramjet/rocket propulsion unit the essential feature of which resides in the use of a solid oxidizer for the rocket and a liquid fuel for both the ramjet and the rocket. In other words, the rocket utilizes a hybrid combustion system, to wit, a solid oxidizer and a liquid fuel, with the latter also used to power the ramjet.

This feature offers the advantage of involving less tricky and dangerous propellant handling and greater mobility of ground facilities for military applications. Indeed the liquids customarily used as the oxidizer are either of the cryogenic type (oxygen), the dangerous type (chlorine trifluoride, nitrogen peroxide, nitric acid, etc. . . .), or both at once (fluorine). In order to achieve high specific impulses recourse must be had to the most dangerous liquids. Furthermore, pressurizing facilities and dual-type tanks are necessary.

This invention overcomes these drawbacks by providing a hybrid system utilizing a liquid fuel and a solid oxidizer. For example, the use of kerosene and ammonium perchlorate gives a specific impulse higher than that of the best current solid propellants.

Generally speaking, a liquid fuel and solid oxidizer will provide the generally recognized advantages of so-called hybrid systems. Furthermore, a non-corrosive oxidizer is used. The use of hybrids for composite ramjet/rocket propulsion systems has the following advantages:
simplicity
controllable thrust
the non-corrosive, stable, solid oxidizer does not require special pressurizing means like a liquid
greater specific impulse (thrust per unit weight consumed per second) than on "all-solid" rockets.

BRIEF DESCRIPTION OF THE DRAWING

FIGURE 1 is a longitudinal schematic sectional view of a composite propulsion unit according to the present invention.

FIGURES 2 and 2a show a fuel feed valve set in two different positions.

The missile illustrated for exemplary purposes in FIGURE 1 includes a rocket casing 1, aft of which is located a rocket motor 2 with its combustion chamber 3 equipped with a solid-oxidizer ring 4 and a convergent-divergent exhaust nozzle 5. A ramjet shroud 6, carried by the rear part of the rocket casing on struts 7, encloses flame-holders 8 and fuel injector rails 9 and in turn supports stabilizer fins 10 used for the aerial portion of the flight and legs 11 for supporting the missile on the ground.

Ahead of combustion chamber 3 the rocket casing 1 contains a liquid fuel tank 12 which, via a three-way valve 13, can be placed in communication either with combustion chamber 3 or with the ramjet injector rails 9.

At take-off the three-way valve 13 is set in the position shown in FIGURE 2. Fuel from tank 12 drops in atomized form into combustion chamber 3 where, upon being spontaneously or deliberately ignited, it burns with the solid oxidizer grain 4. The resulting combustion gases are discharged through the nozzle 5 and impart the required thrust.

Once the desired speed has been attained, the plug of valve 13 is rotated through a quarter-turn either by the flight speed regulator or by remote control from a ground station (FIGURE 2a). Fuel from tank 12 then flows to the ramjet injector rails 9 where it is ignited with air which is previously compressed by its high-speed flow through the shroud 6.

At very high altitude, where the air is rarefied, rocket propulsion is selected once more by rotating valve 13 in the opposite direction (FIGURE 2).

The present invention sets no restriction as to the mode of combustion of the oxidizer grain 4, which grain may be consumer radially, longitudinally, in a combination thereof, or in any other convenient way.

The three-way valve illustrated is an example chosen for the sake of simplicity, but obviously any other convenient means may be resorted to for feeding the fuel to the rocket and the ramjet either concurrently or separately.

It goes without saying that the specific form of embodiment hereinbefore disclosed was given for exemplary purposes only and that many changes and substitutions of parts may be made without departing from the spirit and scope of the invention.

What is claimed is:

1. A composite propulsion unit comprising a rocket including a solid oxidizer grain and defining a first motive gas flow passage, a ramjet around said rocket and defining a second motive gas flow passage separate and distict from said first motive gas flow passage, said first and second passages terminating in substantially the same transverse plane, a liquid fuel tank, and means for feeding said rocket and said ramjet with said liquid fuel from said tank.

2. A composite propulsion unit according to claim 1 wherein said liquid fuel feeding means comprise a common feed pipe connected to said tank, a ramjet feed pipe leading to said ramjet, a rocket feed pipe leading to said rocket, said feed pipes meeting at a junction, and a switch valve at said junction for selectively connecting said common feed pipe with one or the other of said ramjet and rocket feed pipes.

References Cited

UNITED STATES PATENTS

| | | | |
|---|---|---|---|
| 3,093,960 | 6/1963 | Tyson | 60—251 |
| 2,483,045 | 9/1949 | Harby | 60—270 XR |
| 2,675,196 | 4/1954 | Marnay | 60—224 XR |
| 2,716,329 | 8/1955 | Lunger | 60—244 |
| 2,926,613 | 3/1960 | Fox | 60—270 XR |
| 2,998,703 | 9/1961 | Badders | 60—244 |
| 3,103,102 | 9/1963 | Sargent et al. | 60—224 |
| 3,136,119 | 6/1964 | Avery | 60—251 XR |
| 3,176,464 | 4/1965 | Meyer et al. | 60—258 XR |
| 3,221,497 | 12/1965 | Forbes | 60—251 |
| 3,350,887 | 11/1967 | Leunig et al. | 60—251 |

FOREIGN PATENTS

| | | |
|---|---|---|
| 1,064,358 | 12/1953 | France. |
| 1,109,645 | 9/1955 | France. |

CARLTON R. CROYLE, Primary Examiner

DOUGLAS HART, Assistant Examiner

U.S. Cl. X.R.

60—245